(12) United States Patent
Lunttila et al.

(10) Patent No.: US 10,999,846 B2
(45) Date of Patent: May 4, 2021

(54) RESOURCE ALLOCATION IN RANDOM ACCESS PROCEDURE

(71) Applicant: Nokia Technologies Oy, Espoo (FI)

(72) Inventors: Timo Lunttila, Espoo (FI); Esa Tiirola, Kempele (FI); Kari Hooli, Oulu (FI)

(73) Assignee: Nokia Technologies Oy, Espoo (FI)

( * ) Notice: Subject to any disclaimer, the term of this patent is extended or adjusted under 35 U.S.C. 154(b) by 73 days.

(21) Appl. No.: 16/572,578

(22) Filed: Sep. 16, 2019

(65) Prior Publication Data

US 2020/0107322 A1    Apr. 2, 2020

Related U.S. Application Data

(60) Provisional application No. 62/738,557, filed on Sep. 28, 2018.

(51) Int. Cl.
*H04W 72/04* (2009.01)
*H04W 74/08* (2009.01)
*H04W 84/04* (2009.01)

(52) U.S. Cl.
CPC ..... *H04W 72/0453* (2013.01); *H04W 72/042* (2013.01); *H04W 74/0808* (2013.01); *H04W 84/042* (2013.01)

(58) Field of Classification Search
CPC . H04W 72/04; H04W 74/08; H04W 74/0833; H04W 72/0453; H04W 72/042; H04W 74/0808
See application file for complete search history.

(56) References Cited

U.S. PATENT DOCUMENTS 9,313,801 B2    4/2016  Hooli et al.
2018/0110074 A1  4/2018  Akkarakaran et al.
(Continued)

FOREIGN PATENT DOCUMENTS

WO    2017/147550 A1    8/2017
WO    2018/064367 A1    4/2018

OTHER PUBLICATIONS

"Revised SID on NR-based Access to Unlicensed Spectrum", 3GPP TSG-RAN meeting #80, RP-181339, Agenda: 9.4.3, Qualcomm Incorporated, Jun. 11-14, 2018, 5 pages.
(Continued)

*Primary Examiner* — Kyaw Z Soe
(74) *Attorney, Agent, or Firm* — Nokia Technologies Oy

(57) ABSTRACT

A method, apparatus, and computer program product where a UE receives a RACH configuration, comprising time/frequency resources for each RACH Preamble and a corresponding Msg1 Data Part. The UE selects the RACH preamble, transmits the selected RACH preamble, and ascertains whether the selected RACH preamble is associated with a 2-step RA procedure. The UE determines at least one resource for Msg1 Data Part based on the selected RACH preamble. The UE performs a LBT preceding the Msg1 Data Part at a predetermined point in time and transmits the Msg1 Data Part provided that the channel is unoccupied based on the LBT. Likewise, a gNB sending a RACH configuration to the UE, receiving a RACH preamble back, ascertaining that RACH preamble is associated with a 2-step RACH procedure, and determining at least one resource for Msg1 Data Part based on the received RACH preamble.

20 Claims, 8 Drawing Sheets

(56) References Cited

U.S. PATENT DOCUMENTS

| | | |
|---|---|---|
| 2018/0139778 A1 | 5/2018 | Chou et al. |
| 2018/0176961 A1 | 6/2018 | Babaei et al. |
| 2018/0279375 A1* | 9/2018 | Jeon .................. H04W 74/0833 |
| 2018/0279376 A1* | 9/2018 | Dinan ................ H04W 74/0833 |
| 2019/0132882 A1* | 5/2019 | Li ..................... H04L 27/26132 |

OTHER PUBLICATIONS

"3rd Generation Partnership Project; Technical Specification Group Radio Access Network; NR; NR and NG-RAN Overall Description; Stage 2 (Release 15)", 3GPP TS 38.300, V15.2.0, Jun. 2018, pp. 1-87.
"WF on 2-step RACH", RP-182126, Agenda: 9.3.5, Qualcomm Incorporated, Sep. 2018, 2 pages.
"Considerations on Channel Access Procedure for NR-U", 3GPP TSG-RAN WG2 NR meeting #103, R2-1811281, Agenda: 11.2.1.1, ZTE, Aug. 20-24, 2018, 4 pages.
"Two-Step RACH Procedure for NR-U", 3GPP TSG-RAN WG2 meeting #103, R2-1811937, Agenda: 11.2.1.1, Huawei, Aug. 20-24, 2018, 4 pages.

\* cited by examiner

RESOURCE ALLOCATION IN RANDOM ACCESS PROCEDURE

TECHNICAL FIELD

This invention relates generally to Random Access (RA) procedure in especially NR Unlicensed band scenarios and, more specifically, relates to a so-called 2-Step RA procedure.

BACKGROUND

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section.

A more streamlined 2-step RA procedure has been proposed for both licensed and unlicensed band NR. In RAN plenary meeting #81, the following Way Forwards was agreed (RP-182126.zip), stating that "Higher layer aspects of 2-step RACH can be studied within NR-U SI". A 2-step RA procedure typically has a Msg1 that a UE transmits to the gNB simultaneously or consecutively and a Msg2 where the gNB responds to the UE by transmitting a message which includes contents similar to those of 4-step RACH procedure Msg2 and Msg4 such as, for example, the detected RACH preamble ID, UE-ID, timing advance, back-off indicator, contention resolution message, etc. This message is scheduled via PDCCH and transmitted over PDSCH.

In related art, in LTE, Rel-15 WI "Enhancements to LTE operation in unlicensed spectrum" introduced support for autonomous UL transmissions on unlicensed spectrum (SCells in Licensed Assisted Access) with following key characteristics for Autonomous UL Access (AUL):

- A UE can be RRC configured with a set of subframes and HARQ processes that it may use for autonomous PUSCH transmissions.
- AUL operation is activated and released with DCI format OA or 4A.
- A UE skips and AUL allocation if there is no data in UL buffers.
- PRB allocation, MCS, as well as DMRS cyclic shift and orthogonal cover code are indicated to the UE with AUL activation DCI.
- The UE indicates to the eNodeB along with each UL transmission the selected HARQ-process ID, new data indicator, redundancy version, UE ID, PUSCH starting and ending points, as well as whether the UE-acquired channel occupancy time (COT) can be shared with the eNodeB.
- The eNodeB may provide to the UE HARQ feedback for AUL-enabled HARQ processes, transmit power command, and transmit PMI.

AUL also allows for configuring a set of starting positions for UEs with a very fine raster within the first SC-FDMA symbol of a subframe: 16, 25, 34, 43, 52, or 61 microseconds after the subframe boundary, or at the beginning of symbol #1. UE having starting position in the middle of symbol #0 starts the transmission by filling the remaining duration of symbol #0 with the extended CP of symbol #1. Since all UEs perform listen-before-talk operation prior to the AUL transmission to determine whether the channel is free, different starting point allow for e.g. prioritizing transmissions for certain UEs (by assigning an earlier starting point) and reducing the number of collisions.

The current invention moves beyond current techniques and instrumentation.

Abbreviations that may be found in the specification and/or the figures are either defined in the text and/or defined as follows:
3GPP third generation partnership project;
5G fifth generation;
5GC 5G Core network;
AMF Access and Mobility management Function;
AUL Autonomous UL;
B-IFDMA Block-Interleaved Frequency Domain Multiple Access;
BSR Buffer Status Report;
BWP BandWidth Part;
CCE Control Channel Element;
CFRA Contention-Free Random Access;
COT Channel Occupancy Time;
CP Cyclic Prefix;
CU Central Unit;
DCI Downlink Control Information;
DL Downlink;
DRS; Discovery Reference Signal
DU Distributed Unit;
eNB (or eNodeB) evolved Node B (e.g., an LTE base station);
EN-DC E-UTRA-NR dual connectivity;
en-gNB or En-gNB node providing NR user plane and control plane protocol terminations towards the UE, and acting as secondary node in EN-DC;
E-UTRA evolved Universal Terrestrial Radio Access, i.e., the LTE radio access technology;
FDMA Frequency Domain Multiple Access;
GC-PDCCH Group-Common PDCCH;
gNB (or gNodeB) base station for 5G/NR, i.e., a node providing NR user plane and control plane protocol terminations towards the UE, and connected via the NG interface to the 5GC;
I/F Interface;
HARQ Hybrid Automatic Repeat Request;
LBT Listen-Before-Talk;
LTE Long Term Evolution;
MAC Medium Access Control;
MME Mobility Management Entity;
MSG, Msg Message;
NCE Network Control Element;
NDI New Data Indicator;
ng or NG New Generation;
ng-eNB or NG-eNB new generation eNB;
NR New Radio;
NR-U New Radio Unlicensed;
N/W or NW Network;
PAUCCH Physical Autonomous Uplink Control Channel;
PDCCH Physical Downlink Control Channel;
PDCP Packet Data Convergence Protocol;
PDSCH Physical Downlink Shared Channel;
PHY Physical layer;
PRB Physical Resource Block;
PUSCH Physical Uplink Shared Channel;
QoS Quality of Service;
RA Random Access;
RACH Random Access Channel;
RAN Radio Access Network;
Rel Release;
RLC Radio Link Control;
RMSI Remaining Minimum System Information;

RO Random Access Opportunity;
RRC Radio Resource Control;
RRH Remote Radio Head;
RU Radio Unit;
Rx Receiver;
SDAP Service Data Adaptation Protocol;
SGW Serving Gateway;
SMF Session Management Function;
SR Scheduling Request;
TDMA Time Domain Multiple Access;
TS Technical Specification;
Tx transmitter;
UCI Uplink Control Information;
UE User Equipment (e.g., a wireless, typically mobile device);
UL Uplink;
UPF User Plane Function.

BRIEF SUMMARY

Herein a new Random Access (RA) procedure in especially NR Unlicensed band scenarios and, more specifically, relates to a so-called 2-Step RA procedure is presented.

An example of an embodiment of the current invention is a method comprising: receiving a RACH configuration by a UE, wherein the configuration comprises time/frequency resources for each RACH Preamble and a corresponding Msg1 Data Part; selecting the RACH preamble by the UE; transmitting the selected RACH preamble; ascertaining the selected RACH preamble to be associated with a 2-step RA procedure; determining at least one resource for Msg1 Data Part based on the selected RACH preamble; performing a LBT preceding the Msg1 Data Part at a predetermined point in time; transmitting the Msg1 Data Part provided that the channel is unoccupied based on the LBT.

An example of another embodiment of the current invention is a computer program product embodied on a non-transitory computer-readable medium in which a computer program is stored that, when being executed by a computer, is configured to provide instructions to control or carry out at least the following: receiving a RACH configuration by a UE, wherein the configuration comprises time/frequency resources for each RACH Preamble and a corresponding Msg1 Data Part; selecting the RACH preamble by the UE; transmitting the selected RACH preamble; ascertaining the selected RACH preamble to be associated with a 2-step RA procedure; determining at least one resource for Msg1 Data Part based on the selected RACH preamble; performing a LBT preceding the Msg1 Data Part at a predetermined point in time; transmitting the Msg1 Data Part provided that the channel is unoccupied based on the LBT.

An example of another embodiment of the current invention is an apparatus comprising: at least one processor; and at least one memory including computer program code, wherein the at least one memory and the computer program code are configured, with the at least one processor, to cause the apparatus to perform at least the following: receiving a RACH configuration by a UE, wherein the configuration comprises time/frequency resources for each RACH Preamble and a corresponding Msg1 Data Part; selecting the RACH preamble by the UE; transmitting the selected RACH preamble; ascertaining the selected RACH preamble to be associated with a 2-step RA procedure; determining at least one resource for Msg1 Data Part based on the selected RACH preamble; performing the Msg1 Data Part at a predetermined point in time; transmitting the Msg1 Data Part provided that the channel is unoccupied based on the LBT.

An example of another embodiment of the current invention is a method comprising: sending a RACH configuration to a UE, wherein the configuration comprises time/frequency resources for each RACH Preamble and a corresponding Msg1 Data Part. This could also be referred to RS sequence here (to support also item 10 for gNB) recognizing that the term "Msg1 Data Part" contains all the necessary info to receive it, as this could be mad by the following addition "time/frequency/RS sequence"; receiving a RACH preamble from the UE; ascertaining the received RACH preamble to be associated with a 2-step RACH procedure; and determining at least one resource for Msg1 Data Part based on the selected RACH preamble; wherein the at least one resource for Msg1 Data part is at least partially overlapping in time and frequency with a resource for Msg1 Data part associated with a different or another RACH preamble, and wherein reception is available on the Msg1 Data Part on the determined at least one resource.

An example of another embodiment of the current invention is a computer program product embodied on a non-transitory computer-readable medium in which a computer program is stored that, when being executed by a computer, is configured to provide instructions to control or carry out at least the following: sending a RACH configuration to a UE, wherein the configuration comprises time/frequency resources for each RACH Preamble and a corresponding Msg1 Data Part. This could also be referred to RS sequence here (to support also item 10 for gNB) recognizing that the term "Msg1 Data Part" contains all the necessary info to receive it, as this could be mad by the following addition "time/frequency/RS sequence"; receiving a RACH preamble from the UE; ascertaining the received RACH preamble to be associated with a 2-step RACH procedure; and determining at least one resource for Msg1 Data Part based on the selected RACH preamble; wherein the at least one resource for Msg1 Data part is at least partially overlapping in time and frequency with a resource for Msg1 Data part associated with a different or another RACH preamble, and wherein reception is available on the Msg1 Data Part on the determined at least one resource.

An example of another embodiment of the current invention is an apparatus comprising: at least one processor; and at least one memory including computer program code, wherein the at least one memory and the computer program code are configured, with the at least one processor, to cause the apparatus to perform at least the following: sending a RACH configuration to a UE, wherein the configuration comprises time/frequency resources for each RACH Preamble and a corresponding Msg1 Data Part. This could also be referred to RS sequence here (to support also item 10 for gNB) recognizing that the term "Msg1 Data Part" contains all the necessary info to receive it, as this could be mad by the following addition "time/frequency/RS sequence"; receiving a RACH preamble from the UE; ascertaining the received RACH preamble to be associated with a 2-step RACH procedure; and determining at least one resource for Msg1 Data Part based on the selected RACH preamble; wherein the at least one resource for Msg1 Data part is at least partially overlapping in time and frequency with a resource for Msg1 Data part associated with a different or another RACH preamble, and wherein reception is available on the Msg1 Data Part on the determined at least one resource.

This section is intended to include examples and is not intended to be limiting.

BRIEF DESCRIPTION OF THE DRAWINGS

In the attached Drawing Figures:

FIG. 2A illustrates a Contention-Based signaling and FIG. 2B illustrates a Contention-Free signaling;

FIG. 3A is logic flow diagram for a UE concerning the operation of an exemplary method, a result of execution of computer program instructions embodied on a computer readable memory, functions performed by logic implemented in hardware, and/or interconnected means for performing functions in accordance with exemplary embodiments, and where FIG. 3B is logic flow diagram for a gNB concerning the operation of an exemplary method, a result of execution of computer program instructions embodied on a computer readable memory, functions performed by logic implemented in hardware, and/or interconnected means for performing functions in accordance with exemplary embodiments;

DETAILED DESCRIPTION OF THE DRAWINGS

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The exemplary embodiments describe techniques for allocating overlapping (time-frequency) resources for the possible Msg1 Data Parts and to make use of Listen-Before Talk operation in collision avoidance for transmission of Msg1 Data Part in a 2-Step RA procedure.

Additional description of these techniques is presented after a system into which the exemplary embodiments may be used is described.

Figure 1:
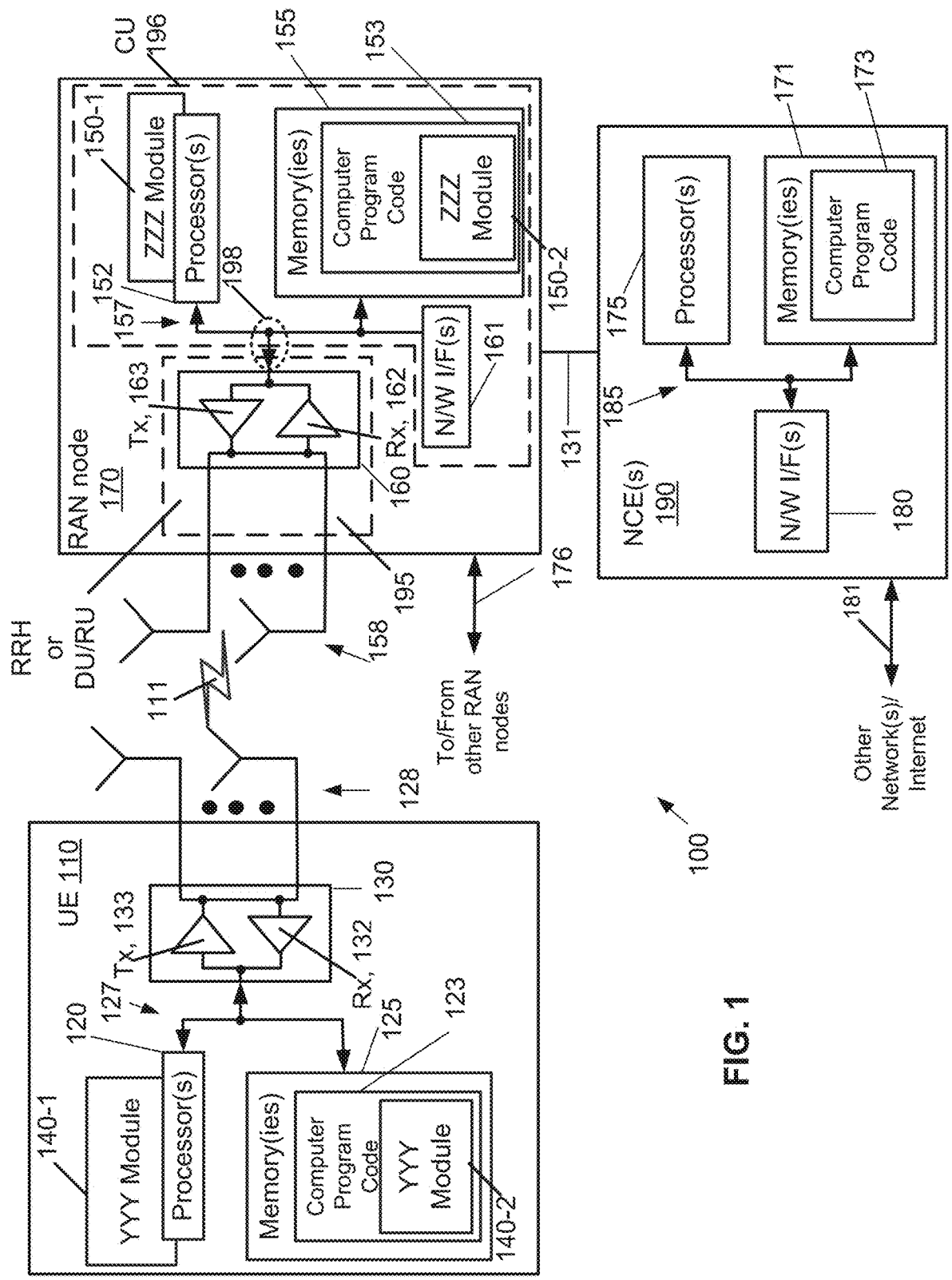
FIG. 1 is a block diagram of one possible and non-limiting exemplary system in which the exemplary embodiments may be practiced.

Turning to FIG. 1, this figure shows a block diagram of one possible and non-limiting exemplary system in which the exemplary embodiments may be practiced. A user equipment (UE) 110, radio access network (RAN) node 170, and network control element(s) (NCE(s)) 190 are illustrated. In FIG. 1, a user equipment (UE) 110 is in wireless communication with a wireless network 100. A UE is a wireless, typically mobile device that can access a wireless network. It may also be a UE part of a relay node. The UE 110 includes one or more processors 120, one or more memories 125, and one or more transceivers 130 interconnected through one or more buses 127.

Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123.

The UE 110 includes a YYY module 140, comprising one of or both parts 140-1 and/or 140-2, which may be implemented in a number of ways. The YYY module 140 may be implemented in hardware as YYY module 140-1, such as being implemented as part of the one or more processors 120. The YYY module 140-1 may be implemented also as an integrated circuit or through other hardware such as a programmable gate array. In another example, the YYY module 140 may be implemented as YYY module 140-2, which is implemented as computer program code 123 and is executed by the one or more processors 120.

For instance, the one or more memories 125 and the computer program code 123 may be configured to, with the one or more processors 120, cause the user equipment 110 to perform one or more of the operations as described herein. The UE 110 communicates with RAN node 170 via a wireless link 111.

The RAN node 170 is a base station that provides access by wireless devices such as the UE 110 to the wireless network 100. It may also be a gNB part of the relay node. The RAN node 170 may be, for instance, a base station for 5G, also called New Radio (NR). In 5G, the RAN node 170 may be a NG-RAN node, which is defined as either a gNB or an ng-eNB. A gNB is a node providing NR user plane and control plane protocol terminations towards the UE, and connected via the NG interface to a 5GC (e.g., the NCE(s) 190). The ng-eNB is a node providing E-UTRA user plane and control plane protocol terminations towards the UE, and connected via the NG interface to the 5GC. The NG-RAN node may include multiple gNBs, which may also include a central unit (CU) (gNB-CU) 196 and distributed unit(s) (DUs) (gNB-DUs), of which DU 195 is shown. Note that the DU may include or be coupled to and control a radio unit (RU). The gNB-CU is a logical node hosting RRC, SDAP and PDCP protocols of the gNB or RRC and PDCP protocols of the en-gNB that controls the operation of one or more gNB-DUs. The gNB-CU terminates the F1 interface connected with the gNB-DU. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU is a logical node hosting RLC, MAC and PHY layers of the gNB or en-gNB, and its operation is partly controlled by gNB-CU. One gNB-CU supports one or multiple cells. One cell is supported by only one gNB-DU. The gNB-DU terminates the F1 interface 198 connected with the gNB-CU. Note that the DU 195 is considered to include the transceiver 160, e.g., as part of an RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station.

The RAN node 170 (which in the shown embodiment could be substituted for a gNB or NR/5G Node B but possibly an evolved NodeB for LTE, long term evolution, but could be any similar access point to a wireless network) that provides access by wireless devices such as the UE 110 to the wireless network 100, includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memories 155, and network interfaces 161. Note that the DU 195 may also contain its own memory/memories and processor(s), and/or other hardware, but these are not shown.

The RAN node 170 includes a 77Z module 150, comprising one of or both parts 150-1 and/or 150-2, which may be implemented in a number of ways. The ZZZ module 150 may be implemented in hardware as 77Z module 150-1, such as being implemented as part of the one or more processors 152. The ZZZ module 150-1 may be implemented also as an integrated circuit or through other hardware such as a programmable gate array. In another example, the ZZZ module 150 may be implemented as ZZZ module 150-2, which is implemented as computer program code 153 and is executed by the one or more processors 152.

For instance, the one or more memories 155 and the computer program code 153 are configured to, with the one or more processors 152, cause the RAN node 170 to perform one or more of the operations as described herein. Note that the functionality of the ZZZ module 150 may be distributed, such as being distributed between the DU 195 and the CU 196, or be implemented solely in the DU 195.

The one or more network interfaces 161 communicate over a network such as via the links 176 and 131. Two or more RANs 170 communicate using link 176. The link 176 may be wired or wireless or both and may implement, e.g., an Xn interface for 5G, an X1 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like.

For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU, and the one or more buses 157 could be implemented in part as, e.g., fiber optic cable or other suitable network connection to connect the other elements (e.g., a central unit (CU), gNB-CU) of the RAN node 170 to the RRH/DU 195. Reference 198 also indicates those suitable network link(s).

It is noted that description herein indicates that "cells" perform functions, but it should be clear that the base station that forms the cell will perform the functions. The cell makes up part of a base station. That is, there can be multiple cells per base station. For instance, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So if there are three 120 degree cells per carrier and two carriers, then the base station has a total of 6 cells.

The wireless network 100 may include a network control element (NCE) (or elements, NCE(s)) 190 that may include core network functionality, and which provides connectivity via a link or links 181 with a further network, such as a telephone network and/or a data communications network (e.g., the Internet). Such core network functionality for 5G may include access and mobility management function(s) (AMF(S)) and/or user plane functions (UPF(s)) and/or session management function(s) (SMF(s)). Such core network functionality for LTE may include MME (Mobility Management Entity)/SGW (Serving Gateway) functionality. These are merely exemplary functions that may be supported by the NCE(s) 190, and note that both 5G and LTE functions might be supported. The RAN node 170 is coupled via a link 131 to the NCE 190. The link 131 may be implemented as, e.g., an NG interface for 5G, or an S1 interface for LTE, or other suitable interface for other standards. The NCE 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the NCE 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Having thus introduced one suitable but non-limiting technical context for the practice of the exemplary embodiments of this invention, the exemplary embodiments will now be described with greater specificity.

Figure 2A:
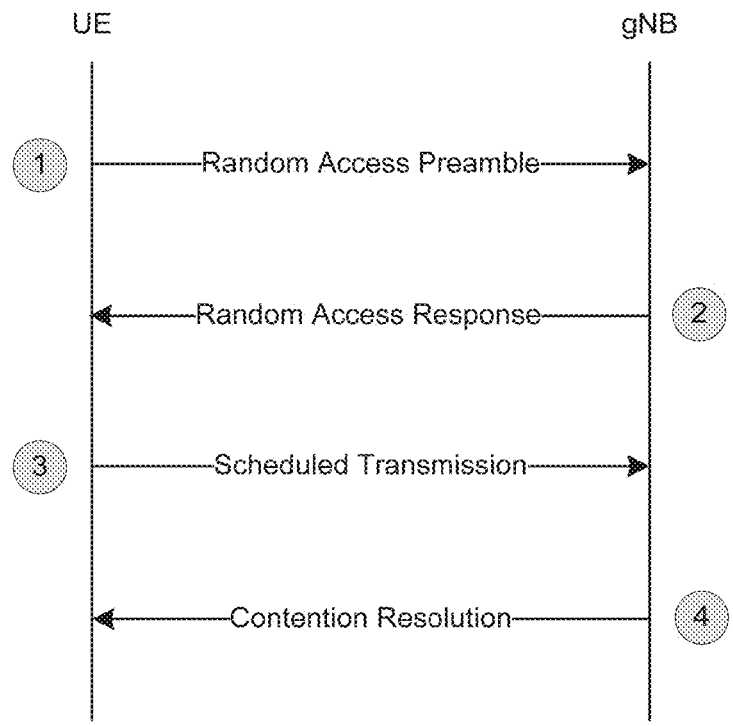
FIG. 2A and FIG. 2B depict Random Access Procedures in a radio system, where
Figure 2B:
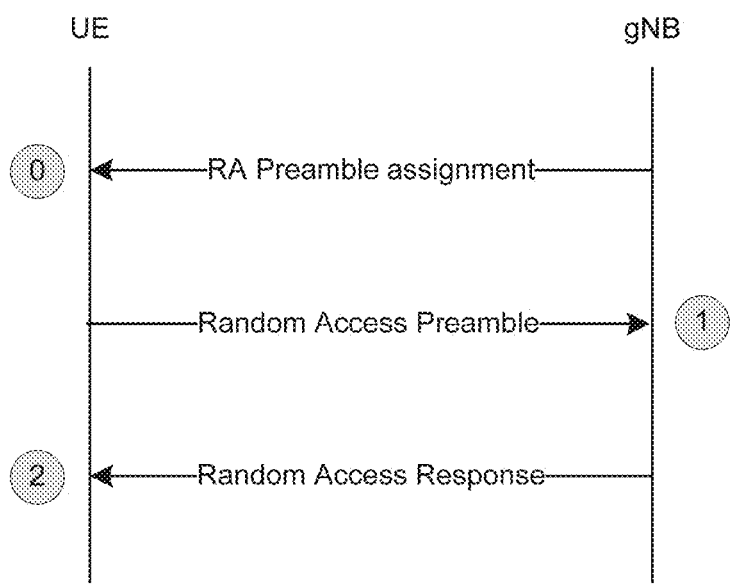

Turning to FIG. 2, the RA procedure in Rel-15 NR is shown in licensed band operation. RA procedure involves either four (contention-based, shown in FIG. 2A) or three (contention-free, shown in FIG. 2B) steps or messages. The RA procedure may be triggered by events such as, for instance: Initial access from RRC_IDLE; RRC Connection Re-establishment procedure; Handover; DL or UL data arrival during RRC_CONNECTED when UL synchronization status is "non-synchronized"; Transition from RRC_INACTIVE; To establish time alignment at SCell addition; Request for Other SI; Beam failure recovery. Similar RA procedures are expected to be supported in NR-Unlicensed band operation too.

Moreover, a more streamlined 2-step RA procedure, comprising two messages, has been proposed for both licensed and unlicensed band NR. Some key points in 2-step RA procedure are as follows for messages 1 and 2.

For MSG1: A UE transmits to the gNB simultaneously or consecutively: the Random Access preamble (Message 1 in FIG. 1(a)), and a data part. The data part may contain essentially the contents or part of contents corresponding to the Message 3 in FIG. 1(a), e.g. RRC Connection request, or at least UE ID. Herein we refer to this as Msg1 Data Part.

For MSG2: The gNB responds to the UE by transmitting a message which includes contents that are at least partially similar to those of 4-step RACH procedure MSG2 and MSG4. The contents may include, for instance: the detected RACH preamble ID, UE-ID, timing advance, back-off indicator, contention resolution message, etc. This message is scheduled via PDCCH and transmitted over PDSCH.

The 2-step RA procedure may seem attractive especially in the unlicensed band scenarios, where LBT procedure, such as energy detection or preamble detection, may be required prior to each transmission, since, as a consequence, fewer LBT attempts are required in 2-step RA than in the 4-step RA, resulting potentially in lower latency for RA procedure. Further, as small cells are expected to be a dominant deployment scenario for NR-Unlicensed, sufficient coverage for Msg1 Data Part can be achieved with a reasonably small resource allocation (per single Msg1 Data Part). Also the problems related to UL synchronization errors during Msg1 Data Part are manageable, as in small cell environment the propagation delay between the UE and gNodeB is relatively small.

However, the 2-step RA procedure presents challenges relating to resource consumption and, specifically, to the resources required for transmitting the RRC connection request or the Msg1 data part:

For Random access preamble transmission, many (e.g. tens of) users can share the same time and frequency resources, such that gNB is able to detect and identify multiple simultaneously transmitted preambles. However, the RRC connection request or Msg1 data part, transmitted on PUSCH, cannot usually tolerate collisions. If multiple messages are transmitted on the same resources, usually at least some of them cannot be decoded correctly. In practice, this means that to ensure reliable decoding of the RRC connection request part or Msg1 data part of Msg1 in 2-step RA procedure, the network must ensure the assigned resource are non-overlapping in time & frequency. This in turn results in increased overhead, as in many scenarios many of the resources are vacant and cannot be used for meaningful UL transmissions.

As a simple illustration of the problem, single NR Rel-15 random access opportunity (RO) supports 64 preambles that can be simultaneously detected and identified. Assuming an exemplary payload of 100 bits for the Msg1 Data Part, QPSK modulation, ⅓ DMRS overhead, and ¼ coding rate, 2 PRBs are needed for each Msg1 Data Part. With 64 preambles, this sums up to 128 PRBs reserved for each RO. Typically only few preambles are transmitted per RO, meaning that most of these resources would remain unused and wasted.

With this invention the issues related to resource allocation overhead associated with 2-step RACH procedure are tackled, taking into account regulatory requirements in place on especially the unlicensed spectrum at above 5 GHz.

As said earlier, we assume that Message 1 is transmitted in two parts: RACH preamble and Msg1 Data Part. These parts are transmitted consecutively, for instance, in consecutive or near-by slots, although there may exist a gap of few symbols or slots. Another assumption is that the starting time of the RACH Preamble transmission is common for all RACH preambles in a cell. This ensures that RACH preambles from different users do not block each other since LBT procedure is performed at the same point in time by all UEs transmitting RACH preambles.

Allocating overlapping (time-frequency) resources for the possible Msg1 Data Parts and making use of Listen-Before Talk operation results in collision avoidance for transmission of Msg1 Data Part in a 2-Step RA procedure.

As discussed in detail below, a UE selects a RA preamble group or a RACH preamble index, dependent on whether LBT is successful or not.

When a UE selects a RA preamble group (unless RACH preamble index is indicated to the UE directly), some of RA preamble groups can be configured or predefined to be used with 2-stage RA procedure while other groups are configured or predefined to be used with 4-stage RA procedure. Different RA preamble groups used with 2-stage RA procedure are associated with different priorities for Msg1 Data Part transmission. Hence the selection of RA preamble group is associated with the selection of RA procedure and Msg1 Data Part priority (note: single RA preamble group may have multiple associated Msg1 Data Part priorities). The selection can be done based e.g. on priority or latency requirement of the RA procedure triggering event, Msg1 Data Part payload size, and pathloss. The selection may also be partially based on pseudo-random selection. Note, too, that in an embodiment UE may simply determine the starting point without separate priority information, where by following such an approach priority is then implicitly given by the starting point.

When a UE selects a RACH preamble index (and preamble) in pseudo-random manner within the selected RA preamble group (unless RACH preamble index is indicated for the UE), the selected RACH preamble index (or, alternatively, the selected RA preamble group) defines one or both of the following two alternatives.

In the first alternative, Alt 1, the selected RACH preamble index (or, alternatively, the selected RA preamble group) defines the starting point, or candidate starting points, for the Msg1 Data Part in 2-step RACH procedure The starting point or candidate starting points may be defined with a raster of approximately 9 microseconds, i.e. one LBT slot. The higher the priority is for Msg1 Data Part, then the earlier the starting point would be. There may be multiple candidate starting points in e.g. different slots/mini-slots. The UE transmits a predefined signal, for instance, an extension of the cyclic prefix, between a given starting point and the next (or other predetermined) symbol boundary.

In the second alternative, Alt 2, the selected RACH preamble index (or, alternatively, the selected RA preamble group) defines the RACH preamble ending point (i.e. the duration of the RACH preamble, or the number of PRACH sequence repetitions). The RACH preamble ending point may be defined with a raster of one OFDM symbol or dependent on the length of the sequence used for RACH preamble. The higher the priority for Msg1 Data part, the later the ending point.

In the case of 2-step RA, prior to transmitting the Msg1 Data Part, the UE performs LBT to check if it is allowed to transmit Msg1 Data Part (or if other UEs will get priority for the Data Part transmission). In Alt 1, the LBT may be based on energy detection immediately prior to the starting position or candidate starting positions. In Alt 2, the LBT may be based on detection of RACH preamble sequence after the UE has transmitted its own RACH preamble.

If LBT is successful, then the UE proceeds with transmitting the Msg1 Data Part and starts to monitor gNB transmissions (on PDCCH) for MSG2 of a 2-step RACH procedure and, potentially also, Random Access Response of a 4-Step RACH procedure, which is beneficial if the gNB has for some reason detected the RACH preamble, but missed the Msg1 Data Part. The UE also starts RA Response Window as part of normal RA procedure.

If LBT is not successful for Msg1 Data Part transmission, and UE cannot transmit Msg1 Data Part, then the UE will start monitoring gNB transmissions (on PDCCH) for Random Access Response of a 4-Step RACH procedure at least for a predefined time, which allows for seamless fallback to 4-Step RACH procedure. The UE also starts RA Response Window as part of normal RA procedure.

In step 1, a UE receives RACH configuration, including time/frequency resources for each RACH Preamble and the corresponding Msg1 Data Part.

RACH configuration may for example be part of system information (RMSI), and transmitted, for instance, along with Discovery Reference Signal, DRS, consisting of for example synchronization and reference signals. This may be the case when applying the invention for RACH preambles may be split into one or more preamble groups, where each of the RACH preamble groups is associated with, for example, whether contention vs non-contention based RA procedure is used, whether 2-step or 4-step RA procedure is used, priority of Msg1 Data Part transmission in case of 2-step RA procedure, including with other known aspects such as the payload size of Msg1 Data Part and pathloss.

Each RACH preamble can be associated with one or multiple resources (in time domain) for the Msg1 Data Part. The association between a RACH preamble and Msg1 Data resource(s) can be predefined. As a starting point, the UE can use the earliest Msg1 Data Part resource, where a latter resource(s) is only used if the UE fails to transmit at an earlier resource, for instance, due to unsuccessful LBT procedure. In another embodiment, the UE can use multiple time domain resources to transmit the Msg1 Data Part multiple times, hence increasing the coverage of Msg1 Data part.

Additionally, the RACH configuration may include information about collision avoidance related aspects, as shown in two alternative exemplary embodiments, labeled Alt1 and Alt2.

Alt1 involves determining which CP extension value to use before transmission of the Msg1 Data Part. The CP extension value may be: directly given by the RACH configuration; or a range of possible values for CP extension is given, and the UE chooses the exact value for CP extension based on the preamble index and, potentially, on the time domain order (e.g. slot number) of the Msg1 Data Part resource. Alternatively, the selection of the values for CP extension may be pseudo-random, or depend of at least one of: a UE identity, slot index, or a combination thereof. In an embodiment, multiple preambles map to the same CP extension value, where in that case each preamble is associated with unique DMRS on Msg1 data part. An energy detection LBT is performed just before the transmission of Msg1 Data Part or the transmission of extended CP preceding Msg1 Data Part unless the largest CP extension value (earliest starting point) is used. In this case the RACH preamble and Msg1 Data part may be contiguous in time. In other words, CP extension is used between when LBT for Msg1 Data Part is performed ("predetermined point time") and the start of the Msg1 Data Part.

Alt 2, additionally or alternatively, determines how many RACH preamble sequence repetitions to use in RACH preamble transmission; determines whether to perform "LBT" based on RACH preamble sequence detection; determines the time instance (e.g. relative to the start of RACH preamble or slot boundary) at which to perform RACH preamble sequence detection; and may determine which RACH root sequence to use in the detection. In above, RACH preamble consists of CP and RACH preamble sequence repeated multiple times.

The RACH configuration may be (at least partially) specific for each preamble group.

In step 2, the UE selects the RACH preamble group, selects the RACH preamble within the group (unless the index of the RACH preamble has been indicated to UE as part of CFRA), performs the first LBT preceding the RACH preamble, and transmits the selected RACH preamble provided that the channel is unoccupied based on the first LBT. The selection of the preamble (and preamble group) may depend on the following: whether two-step vs. 4-step RACH procedure is applied; what is the Msg1 Data Part priority based on the priority of RA triggering event; the payload size of Msg1 Data Part, and/or the Pathloss.

In step 3, the UE performs LBT (energy detection or RACH preamble sequence detection) at a predetermined point in time. If the operating channel is free, the UE transmits the Msg1 Data Part of 2-Step RACH. UE may also transmit CP extension until the symbol boundary where the Msg1 Data Part starts. If the operating channel is not free, UE may try again n times if multiple (n+1) resources are configured in Step 302 above.

In step 4, the UE monitors DL (PDCCH) for: Msg2 of 2-Step RACH, and Random Access Response (Msg2 of a 4-step RACH). If UEs did not send Msg1 Data Part in 2-Step RACH, (due to e.g. unsuccessful LBT) it may only monitor the Random Access Response/Msg2 of a 4-step RACH).

Finally, in step 5, the UE continues the RACH procedure based on Step 308 such that if Msg2 of 2-Step RACH is received, then the UE transmits acknowledgement for the Msg2 of 2-Step RACH and RACH procedure ends; if Msg2 of 4-step RACH is received, then the UE continues 4-step RACH procedure with Msg3; and if no message received, then the UE falls back to Step 304 and re-transmits at least PRACH preamble potentially with increased Tx power.

In one embodiment, the network or the gNB may indicate to the UE via downlink control signaling, such as group-common physical downlink control channel, GC-PDCCH, whether a certain upcoming resource for Msg1 Data Part is enabled, and can be used for transmission, or disabled. This allows for the network or the gNB to control the overhead associated with Msg1 Data Part resources, by for example disabling the resources in case there is a need to use them for other DL or UL data transmissions.

Configuration of PRACH, and correspondingly, PRACH Msg1 Data Part resources, may be contained on system information. Hence, the size of configuration message needs to be minimized. For that purpose, a set of predefined PRACH Msg1 Data Part resource configurations may be predefined and just an indication of certain configuration is signaled to UE.

Alternatively, the PRACH Msg1 Data Part resources can be determined based on small number of parameters. For example, certain LBT type (energy detection or PRACH sequence detection) and, for instance, CP extension value may be associated (by specification) with a specific PRACH preamble group. On the other hand, signaling may indicate location of first Msg1 Data Part resource, number of PRBs for a given Msg1 Data Part resource, and number of Msg1 Data Part resources per RO (or PRACH preamble group). Based on these parameters and predefined rules UE (and gNB) determine the other Msg1 Data Part resources as well as the association between the PRACH preamble and Msg1 Data Part resource.

Configuration of PRACH, and correspondingly, PRACH Msg1 Data Part resources, may be contained on system information. Hence, the size of configuration message needs to be minimized. For that purpose, a set of predefined PRACH Msg1 Data Part resource configurations may be predefined and just an indication of certain configuration is signaled to the UE. Alternatively, the PRACH Msg1 Data Part resources can be determined based on small number of parameters, for example, where certain LBT type (energy detection or PRACH sequence detection) and e.g. CP extension value may be associated (by specification) to a specific PRACH preamble group or where signaling may indicate location of first Msg1 Data Part resource, PRB size of single Msg1 Data Part resource and number of Msg1 Data Part resources per RO (or PRACH preamble group). Based on these parameters and predefined rules UE (and gNB) determine the other Msg1 Data Part resources as well as the association between the PRACH preamble and Msg1 Data Part resource.

Regarding association of PRACH preamble to PRACH Msg1 Data Part resource(s), two examples are provided. In a first example of PRACH preamble and Msg1 Data Part resource association, assuming PRACH preamble group contains N preambles, there is single Msg1 Data Part priority for the preambles within the group, and other preamble groups use different Msg1 Data Part priorities, n0 is the last preamble of previous preamble group, there are M Msg1 Data Part resources, N<M (as otherwise multiple preambles would be associated with the same Msg1 Data resource with the same priority; however, M<number of preamble per RO), then the Msg1 Data Part resource index m may be associated to the PRACH preamble index n by $m = n \bmod M$, where $n = n_0 + 1 \ldots n_0 + N$ In another example of PRACH preamble and Msg1 Data Part resource association, assuming PRACH preamble group contains N preambles, there are multiple Msg1 Data Part priorities (denoted with k, and starting from priority k0) within the preamble group, n0 is the last preamble of previous preamble group, there are M Msg1 Data Part resources per TTI (e.g. slot) and S TTIs available for Msg1 Data Part, M×S<N (as otherwise it would make sense to assign dedicated Msg1 Data Part resource for each preamble), then the Msg1 Data Part resource index m and Msg1 Data Part priority k may be associated to the PRACH preamble index n by $$m = n \bmod M,$$
$$k = k_0 + \lceil \frac{n - n_0}{M} \rceil \text{ where } n = n_0 + 1 \ldots n_0$$

The Msg1 Data Part resource index m and Msg1 Data Part priority k may remain the same for all S TTIs, as in the case that another higher priority random access occupies the same Msg1 Data Part resource m in TTI s, it will not try to transmit Msg1 Data Part anymore in the next TTI s+1.

Given the proposed solution of the current invention, two new error cases may arise.

In the first error scenario, two UEs simultaneously transmit the same preamble and on the same Msg1 Data Part resource. The gNB detects the preamble from UE #1 but Msg1 Data Part from UE #2. This problem exists also with other 2-stage RA solutions and in slightly different form also with 4-stage RA procedure. It is assumed that the UE identifier transmitted in the Msg1 is repeated or used (e.g. as RNTI) in Msg2 by gNB, which solves the contention. In this scenario, UE #2 successfully completes the RA procedure but with wrong TA value (as measured from UE #1 preamble). The wrong TA value will be later detected and corrected by normal timing advance procedure. In other words, the error case can be corrected easily with normal mechanisms.

In the second scenario, the UEs simultaneously transmit a different preamble (preambles A & B). The preambles have the same associated Msg1 Data Part resource but with different priority (e.g. starting point, in case of Alt1). For some reason, the LBT mechanism fails and both UEs transmit Msg1 Data Part on the same resource. The gNB receives preambles from UE #1 and UE #2 as well as Msg1 Data Part from UE #2. However, based on the Msg1 Data Part priorities associated to the detected preambles, the gNB assumes that it received both preamble from UE #1 and Msg1 Data Part from UE #1 and only preamble from UE #2. It is assumed in this second scenario that a UE identifies its Msg2 content based on RA-RNTI and preamble index or based on the UE identifier (RNTI) in the Msg1 Data Part. In the case that RA-RNTI and preamble index is used, it is assumed that UE identifier transmitted in the Msg1 is repeated in Msg2. As such, UE #1 can detect that a wrong identifier is used in Msg2 and re-start the random access procedure. UE #2 can detect its RA-RNTI and preamble index in the fallback 4-stage Random Access Response, and complete the random access via 4-stage procedure. In other words, the error case can be corrected easily with normal mechanisms of random access procedure.

Figure 3A:
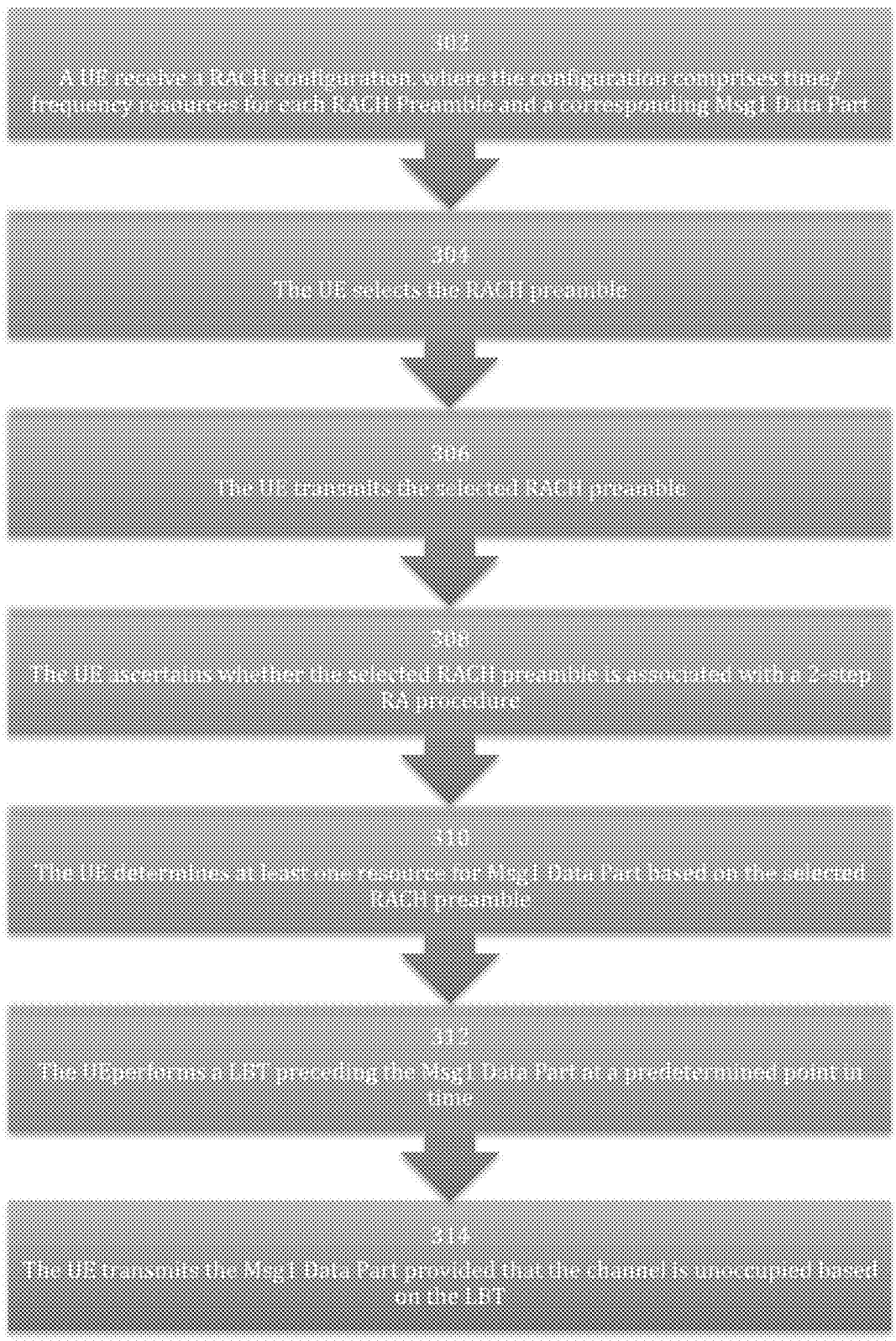
FIG. 3A and FIG. 3B are logic flow diagrams, where

FIG. 3A is a logic flow diagram for a UE operation according to exemplary embodiments of the present invention. This figure further illustrates the operation of an exemplary method or methods, a result of execution of computer program instructions embodied on a computer readable memory, functions performed by logic implemented in hardware, and/or interconnected means for performing functions in accordance with exemplary embodiments. For instance, the YYY module 140 may include multiples ones of the blocks in FIG. 3, where each included block is an interconnected means for performing the function in the block. The blocks in FIG. 3 are assumed to be performed by the UE 110, e.g., under control of the YYY module 140 at least in part.

In exemplary method 300, shown in FIG. 3A, in step 302, a UE receives a RACH configuration, where the configuration comprises time/frequency resources for each RACH Preamble and a corresponding Msg1 Data Part. In step 304, the UE selects the RACH preamble. In step 306, the UE transmits the selected RACH preamble. In step 308, the UE ascertains whether the selected RACH preamble is associated with a 2-step RA procedure. In step 310, the UE determines at least one resource for Msg1 Data Part based on the selected RACH preamble. In step 312, the UE performs a LBT preceding the Msg1 Data Part at a predetermined point in time. And in step 314, the UE transmits the Msg1 Data Part provided that the channel is unoccupied based on the LBT.

Figure 3B:
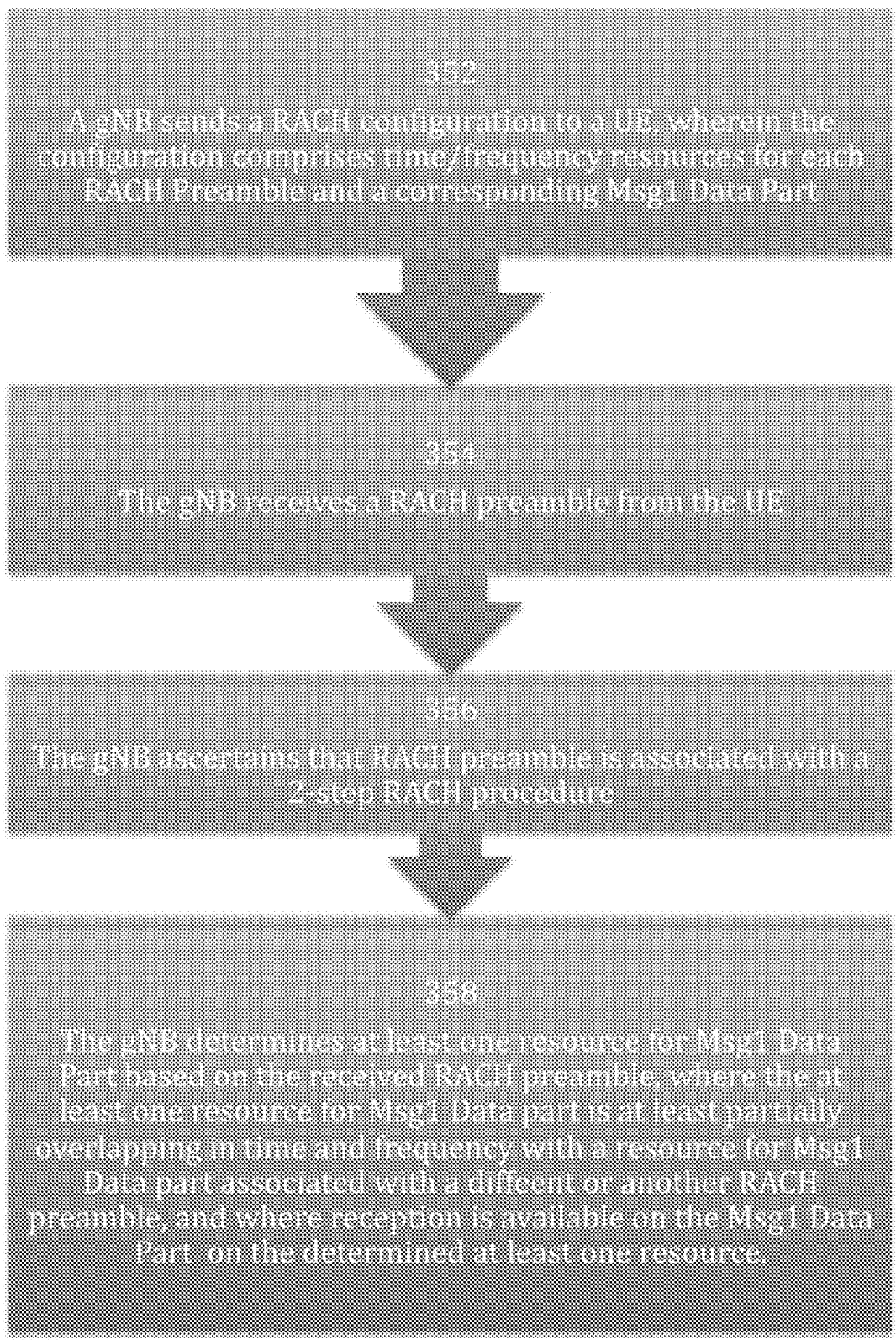

FIG. 3B is a logic flow diagram for a gNB operation according to exemplary embodiments of the present invention. This figure further illustrates the operation of an exemplary method or methods, a result of execution of computer program instructions embodied on a computer readable memory, functions performed by logic implemented in hardware, and/or interconnected means for performing functions in accordance with exemplary embodiments. For instance, the ZZZ module 150 may include multiples ones of the blocks in FIG. 3, where each included block is an interconnected means for performing the function in the block. The blocks in FIG. 3 are assumed to be performed by a base station such as RAN node 170, e.g., under control of the ZZZ module 150 at least in part.

In exemplary method 350, shown in FIG. 3B, in step 352 a gNB sends a RACH configuration to a UE, wherein the configuration comprises time/frequency resources for each RACH Preamble and a corresponding Msg1 Data Part. In step 354, the gNB receives a RACH preamble from the UE. In step 356, the gNB ascertains that RACH preamble is associated with a 2-step RACH procedure. And in step 358, the gNB determines at least one resource for Msg1 Data Part based on the received RACH preamble, where the at least one resource for Msg1 Data part is at least partially overlapping in time and frequency with a resource for Msg1 Data part associated with different or another RACH preamble (given that RACH preambles can be received simultaneously) and where reception is available on the Msg1 Data Part on the determined at least one resource. Reception being available on the Msg1 Data Part on the determined at least one resource means that gNB attempts to receive the Msg1 Data Part on the determined at least one resource, and the gNB either receives the Msg1 Data Part or does not receive the Msg1 Data Part. In other words, the reception being available on the Msg1 Data Part on the determined at least one resource means that gNB receives the Msg1 Data Part on the determined at least one resource with reception being either successfully or not successful.

Figure 4:
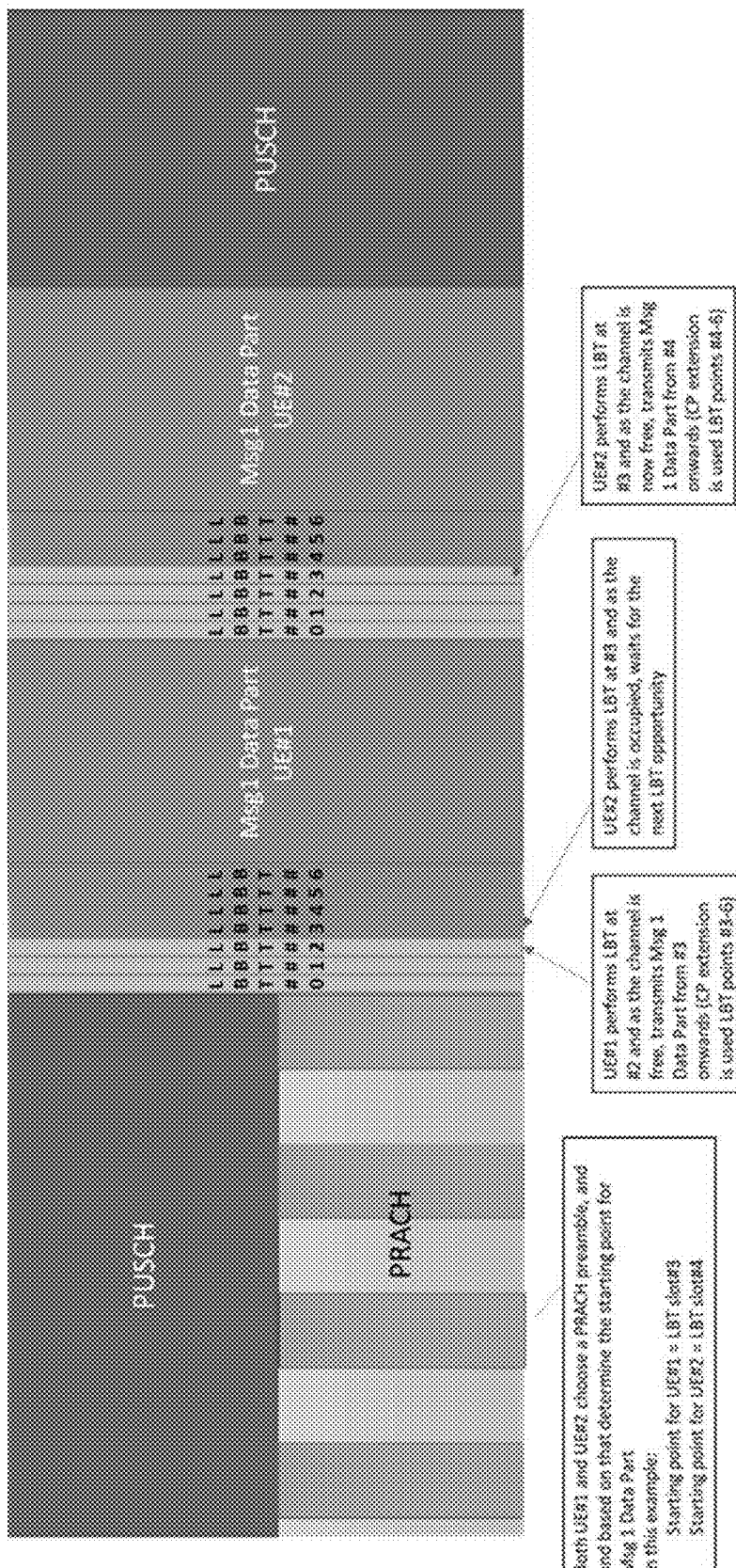
FIG. 4 is an illustration of resource allocations according to the Alt1 embodiment discussed herein below.
Figure 5:
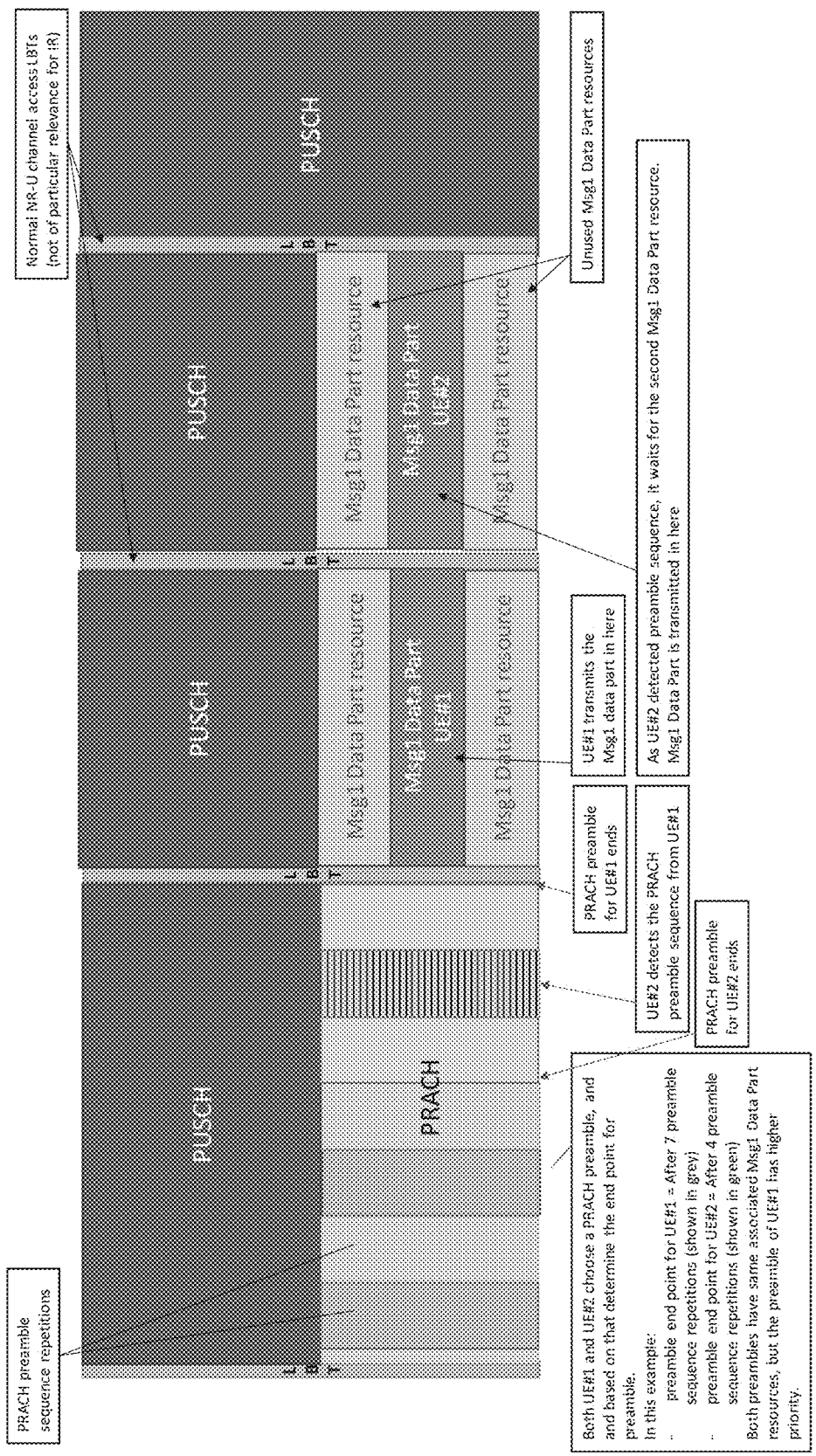
FIG. 5 is an illustration of resource allocations according to the Alt2 embodiment discussed herein below.
Figure 6:
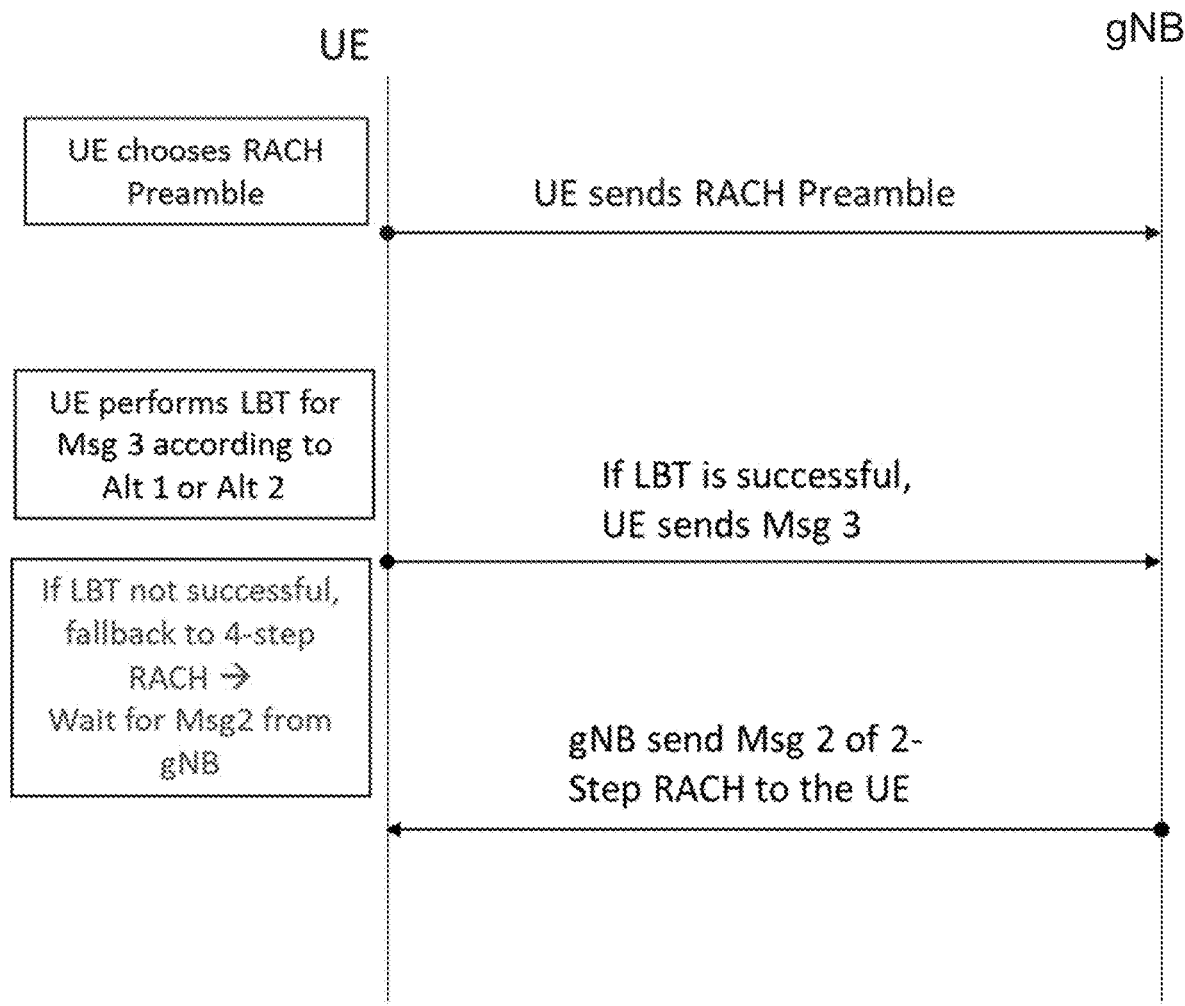
FIG. 6 is an illustration of 2-step resource allocation according to the an embodiment discussed herein below.
Figure 7:
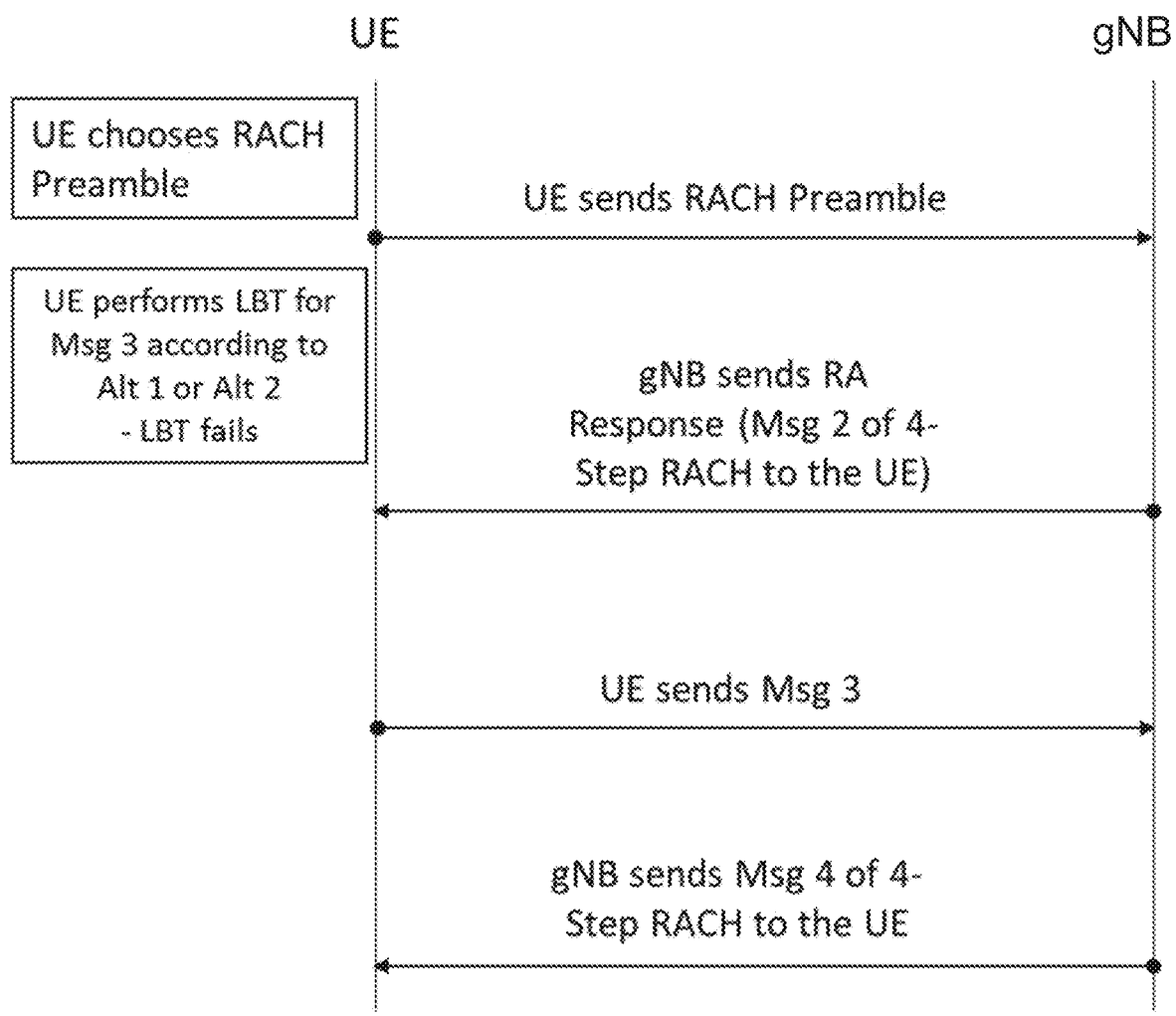
FIG. 7 is an illustration of a 4-step resource allocation according to an embodiment discussed herein below.

Examples of RACH preamble and Msg1 Data Part transmission are shown in FIG. 4 and FIG. 5. X-axis represents time and Y-axis represents frequency.

FIG. 4 is an illustration of RACH procedure according to Alternative 1 embodiment, the allocations are drawn to be continuous in frequency simply to show a clear illustration, nonetheless, various frequency allocations may be used, such as Block IFDMA interlaced allocation or IFDMA allocation for instance.

FIG. 5 is an illustration of RACH procedure according to Alternative 2. From the figures it can be noted that Alternative 1 (Alt1) supports TDMA between Msg1 Data Part and PUSCH while Alternative 2 (Alt2) supports FDMA between different Msg1 Data Parts and PUSCH but with fewer LBT priority levels.

Without in any way limiting the scope, interpretation, or application of the claims appearing below, a technical effect of one or more of the example embodiments disclosed herein is that it provides the benefits of low-latency 2-Step RA procedure while allowing for low overhead in terms of reserved PUSCH resources.

Without in any way limiting the scope, interpretation, or application of the claims appearing below, another technical effect of one or more of the example embodiments disclosed herein is that it allows for minimizing the collisions for transmission of the Msg1 Data Part in 2-Step RACH procedure.

Without in any way limiting the scope, interpretation, or application of the claims appearing below, another technical effect of one or more of the example embodiments disclosed herein is that it supports seamless fallback to 4-step RA procedure in case the gNB fails to successfully receive (e.g. due to UE failing to transmit) the Msg1 Data Part.

Without in any way limiting the scope, interpretation, or application of the claims appearing below, another technical effect of one or more of the example embodiments disclosed herein is that it improves the usage of the resources allocated for the Msg1 Data Part. As typically only a fraction of preambles are transmitted per RO, the same overlapping resources for the Data Part can be allocated to multiple Msg1s. The price paid in the case of colliding Msg1 Data Part resources is acceptable, thanks to collision avoidance mechanism (allowing one of the colliding Msg1 Data Parts to be transmitted) and seamless and immediate fallback to 4-step RA procedure. The gNB can also override the Msg1 Data Part resources simply by transmitting in the DL, or by scheduling in the UL, other transmissions on top, with an earlier starting point. Note, too, that that LBT performed by UEs running 2-step RA procedure prevents those UEs from transmitting their Msg1 data parts via those resources.

Without in any way limiting the scope, interpretation, or application of the claims appearing below, another technical effect of one or more of the example embodiments disclosed herein is that overall the invention provides gNB with a flexible control over the trade-off between successful 2-Step RA procedure and associated overhead.

Without in any way limiting the scope, interpretation, or application of the claims appearing below, another technical effect of one or more of the example embodiments disclosed herein is that the invention can be seen as a low-complex solution from gNB implementation point of view. The solution does not change the RACH receiver (used to detect RA preamble) and the solution does not require gNB blind detection for Msg1 Data part (blind detection may be based on RA preambles only).

As used in this application, the term "circuitry" may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation."

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Embodiments herein may be implemented in software (executed by one or more processors), hardware (e.g., an application specific integrated circuit), or a combination of software and hardware. For example, in an embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, as in FIG. 1 for example. A computer-readable medium may comprise a computer-readable storage medium (e.g., memories 125, 155, 171 or other device) that may be any media or means that can contain or store the instructions for use by or in connection with an instruction execution system, apparatus, or device, such as a computer.

The current architecture in LTE networks is fully distributed in the radio and fully centralized in the core network. The low latency requires bringing the content close to the radio which leads to local break out and multi-access edge computing (MEC). 5G may use edge cloud and local cloud architecture. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomous self-healing networks, remote cloud services and augmented reality. In radio communications, using edge cloud may mean node operations to be carried out, at least partly, in a server, host or node operationally coupled to a remote radio head or base station comprising radio parts. It is also possible that node operations will be distributed among a plurality of servers, nodes or hosts. It should also be understood that the distribution of labor between core network operations and base station operations may differ from that of the LTE or even be non-existent. Some other technology advancements probably to be used are Software-Defined Networking (SDN), Big Data, and all-IP, which may change the way networks are being constructed and managed.

One possible manner to carry out embodiments described herein is with an edge cloud using a distributed computing system. An exemplary embodiment comprises a radio node connected to a server. Exemplary embodiments implementing the system allow the edge cloud server and the radio node as stand-alone apparatuses communicating with each other via a radio path or via a wired connection or they may be located in a same entity communicating via a wired connection.

Although various aspects of the invention are set out in the independent claims, other aspects of the invention comprise other combinations of features from the described embodiments and/or the dependent claims with the features of the independent claims, and not solely the combinations explicitly set out in the claims.

If desired, the different functions discussed herein may be performed in a different order and/or concurrently with each other. Furthermore, if desired, one or more of the above-described functions may be optional or may be combined.

An example of an embodiment of the current invention, which can be referred to as item 1, is a method comprising: receiving a RACH configuration by a UE, wherein the configuration comprises time/frequency resources for each RACH Preamble and a corresponding Msg1 Data Part; selecting the RACH preamble by the UE; transmitting the selected RACH preamble; ascertaining the selected RACH preamble to be associated with a 2-step RA procedure; determining at least one resource for Msg1 Data Part based on the selected RACH preamble; performing a LBT preceding the Msg1 Data Part at a predetermined point in time; transmitting the Msg1 Data Part provided that the channel is unoccupied based on the LBT.

An example of another embodiment of the current invention, which can be referred to as item 2, is the method of any preceding method item, wherein the RACH configuration is part of system information (RMSI) and is transmitted along with DRS.

An example of another embodiment of the current invention, which can be referred to as item 3, is the method of any preceding method item, wherein the RACH preambles are split into one or more preamble groups, where each of the RACH preamble groups is associated with at least one of: whether contention versus non-contention based RA procedure is used; whether 2-step vs. 4-step RA procedure is used; priority of Msg1 Data Part transmission in case of 2-step RA procedure payload size of Msg1 Data Part; pathloss.

An example of another embodiment of the current invention, which can be referred to as item 4, is the method of any preceding method item, wherein a high priority of Msg1 Data transmission corresponds to an early LBT time (or earlier point in time for LBT) for Msg1 Data part and a low priority of Msg1 Data transmission corresponds to a late LBT time (or, correspondingly, later point in time for LBT) for Msg1 Data part, or wherein a high priority of Msg1 Data transmission corresponds to not performing LBT preceding the Msg1 Data part, and a low priority of Msg1 Data transmission corresponds to performing LBT preceding the Msg1 Data part.

An example of another embodiment of the current invention, which can be referred to as item 5, is the method of any preceding method item, wherein determining at least one resource for Msg1 Data Part based on the selected RACH preamble further comprises receiving downlink control signaling indicating whether the resource for Msg1 Data Part is enabled or disabled.

An example of another embodiment of the current invention, which can be referred to as item 6, is the method of any preceding method item, wherein, for the determining, the selected RACH preamble is associated with one or multiple resources (in time domain) for the Msg1 Data Part.

An example of another embodiment of the current invention, which can be referred to as item 7, is the method of any preceding method item, wherein resource(s) other than the first Msg1 Data Part resource is only used if the UE fails to transmit at first Msg1 Data Part resource due to unsuccessful LBT.

An example of another embodiment of the current invention, which can be referred to as item 8, is the method of any preceding item, wherein in response to a failed transmission, repeating transmission by the UE of Msg1 Data part on at least one time domain resource.

An example of another embodiment of the current invention, which can be referred to as item 9, is the method of any preceding method item, further comprising choosing a CP extension value to use before transmission of the Msg1 Data Part based on the predetermined point in time the LBT is performed.

An example of another embodiment of the current invention, which can be referred to as item 10, is the method of any preceding method item, wherein the CP extension value is given directly by the RACH configuration or via a range of possible values, wherein the UE chooses the exact value for CP extension based on the preamble index and/or on the time domain index (slot number) of the Msg1 Data Part resource.

An example of another embodiment of the current invention, which can be referred to as item 11, is the method of any preceding method item, wherein in response to multiple preambles mapping to same CP extension value, each preamble is associated with unique DMRS on Msg1 data part.

An example of another embodiment of the current invention, which can be referred to as item 12, is the method of any preceding method item, based on at least one of the selected PRACH preamble and the selected PRACH preamble group, further comprising at least one of: determining a number of RACH preamble sequence repetitions to use in RACH preamble transmission; and deciding whether to perform LBT based on RACH preamble sequence detection.

An example of another embodiment of the current invention, which can be referred to as item 13, is the method of any preceding method item, further comprising in response to performing LBT based on RACH sequence detection: calculating time instance relative to the start of RACH preamble or slot boundary for performing RACH preamble sequence detection.

An example of another embodiment of the current invention, which can be referred to as item 14, is the method of any preceding method item, further comprising performing LBT based on energy detection or based on RACH preamble sequence detection at a predetermined point in time.

An example of another embodiment of the current invention, which can be referred to as item 15, is the method of any preceding method item, in response to multiple resources for Msg1 Data Part being indicated in the received RACH configuration and the channel is occupied based on the LBT, further comprising: performing another LBT prior to another Msg1 Data Part resource.

An example of another embodiment of the current invention, which can be referred to as item 16, is the method of any preceding method item, wherein selection of the preamble (and preamble group) depends on at least one of: whether a two-step or a 4-step RA procedure is applied the Msg1 Data Part priority based on the priority of RA triggering event. Payload size of Msg1 Data Part Pathloss.

An example of another embodiment of the current invention, which can be referred to as item 17, is the method of any preceding method item, after transmitting Msg1 Data Part, further comprising monitoring DL control channel for Msg2 of a 2-Step RACH and Msg2 of a 4-step RACH; and in response to receiving: a Msg2 of a 2-Step RACH, ending RA procedure by transmitting an acknowledgement; a Msg2 of a 4-step RACH, continuing 4-step RA procedure by transmitting a Msg3; and no message, returning to selecting the RACH preamble group by the UE and re-transmitting at least PRACH preamble potentially with increased Tx power.

An example of another embodiment of the current invention, which can be referred to as item 18, is the method of any preceding method item, wherein in response UE not having sent Msg1 Data Part in 2-Step RA, the monitoring consists of monitoring for the Msg2 of a 4-step RACH.

An example of another embodiment of the current invention, which can be referred to as item 19, is a computer program comprising code for controlling or performing the method of any preceding method item.

An example of another embodiment of the current invention, which can be referred to as item 20, is a computer program comprising: code for receiving a RACH configuration by a UE, wherein the configuration comprises time/frequency resources for each RACH Preamble and a corresponding Msg1 Data Part; code for selecting the RACH preamble by the UE; code for transmitting the selected RACH preamble; code for ascertaining the selected RACH preamble to be associated with a 2-step RA procedure; code for determining at least one resource for Msg1 Data Part based on the selected RACH preamble; code for performing a LBT preceding the Msg1 Data Part at a predetermined point in time; code for transmitting the Msg1 Data Part provided that the channel is unoccupied based on the LBT.

An example of another embodiment of the current invention, which can be referred to as item 21, is a computer program product comprising a computer-readable medium bearing the computer program code of items 19 or 20 embodied therein for use with a computer.

An example of another embodiment of the current invention, which can be referred to as item 22, is a computer program product embodied on a non-transitory computer-readable medium in which a computer program is stored that, when being executed by a computer, is configured to provide instructions to control or carry out the method of any of items 1-18.

An example of another embodiment of the current invention, which can be referred to as item 23, is a computer program product embodied on a non-transitory computer-readable medium in which a computer program is stored that, when being executed by a computer, is configured to provide instructions to control or carry out at least the following: receiving a RACH configuration by a UE, wherein the configuration comprises time/frequency resources for each RACH Preamble and a corresponding Msg1 Data Part; selecting the RACH preamble by the UE; transmitting the selected RACH preamble; ascertaining the selected RACH preamble to be associated with a 2-step RA procedure; determining at least one resource for Msg1 Data Part based on the selected RACH preamble; performing a LBT preceding the Msg1 Data Part at a predetermined point in time; transmitting the Msg1 Data Part provided that the channel is unoccupied based on the LBT.

An example of another embodiment of the current invention, which can be referred to as item 24, is a device comprising means for performing each step of items 1-18.

An example of another embodiment of the current invention, which can be referred to as item 25, is a device comprising: means for receiving a RACH configuration by a UE, wherein the configuration comprises time/frequency resources for each RACH Preamble and a corresponding Msg1 Data Part; means for selecting the RACH preamble by the UE; means for transmitting the selected RACH preamble; means for ascertaining the selected RACH preamble to be associated with a 2-step RA procedure; means for determining at least one resource for Msg1 Data Part based on the selected RACH preamble; means for performing a LBT preceding the Msg1 Data Part at a predetermined point in time; means for transmitting the Msg1 Data Part provided that the channel is unoccupied based on the LBT.

An example of another embodiment of the current invention, which can be referred to as item 26, is an apparatus comprising: at least one processor; and at least one memory including computer program code, wherein the at least one memory and the computer program code are configured, with the at least one processor, to cause the apparatus to perform at least the following: receiving a RACH configuration by a UE, wherein the configuration comprises time/frequency resources for each RACH Preamble and a corresponding Msg1 Data Part; selecting the RACH preamble by the UE; transmitting the selected RACH preamble; ascertaining the selected RACH preamble to be associated with a 2-step RA procedure; determining at least one resource for Msg1 Data Part based on the selected RACH preamble; performing a LBT preceding the Msg1 Data Part at a predetermined point in time; transmitting the Msg1 Data Part provided that the channel is unoccupied based on the LBT.

An example of another embodiment of the current invention, which can be referred to as item 27, is the apparatus of any preceding apparatus item, wherein the RACH configuration is part of system information (RMSI) and is transmitted along with DRS.

An example of another embodiment of the current invention, which can be referred to as item 28, is the apparatus of any preceding apparatus item, wherein the RACH preambles are split into one or more preamble groups, where each of the RACH preamble groups is associated with at least one of: whether contention versus non-contention based RA procedure is used; whether 2-step vs. 4-step RA procedure is used; priority of Msg1 Data Part transmission in case of 2-step RA procedure payload size of Msg1 Data Part; pathloss.

An example of another embodiment of the current invention, which can be referred to as item 29, is the apparatus of any preceding apparatus item, wherein a high priority of Msg1 Data transmission corresponds to an early LBT time (or earlier point in time for LBT) for Msg1 Data part and a low priority of Msg1 Data transmission corresponds to a late LBT time (or, correspondingly, later point in time for LBT) for Msg1 Data part, or wherein a high priority of Msg1 Data transmission corresponds to not performing LBT preceding the Msg1 Data part, and a low priority of Msg1 Data transmission corresponds to performing LBT preceding the Msg1 Data part.

An example of another embodiment of the current invention, which can be referred to as item 30, is the apparatus of any preceding apparatus item, wherein determining at least one resource for Msg1 Data Part based on the selected RACH preamble further comprises receiving downlink control signaling indicating whether the resource for Msg1 Data Part is enabled or disabled.

An example of another embodiment of the current invention, which can be referred to as item 31, is the apparatus of any preceding apparatus item, wherein, for the determining, the selected RACH preamble is associated with one or multiple resources (in time domain) for the Msg1 Data Part.

An example of another embodiment of the current invention, which can be referred to as item 32, is the apparatus of any preceding apparatus item, wherein resource(s) other than the first Msg1 Data Part resource is only used if the UE fails to transmit at first Msg1 Data Part resource due to unsuccessful LBT.

An example of another embodiment of the current invention, which can be referred to as item 33, is the apparatus of any preceding apparatus item, wherein in response to a failed transmission the at least one memory and the computer program code are further configured, with the at least one processor, to cause the apparatus to perform at least the following: repeating transmission by the UE of Msg1 Data part on at least one time domain resource.

An example of another embodiment of the current invention, which can be referred to as item 34, is the apparatus of any preceding apparatus item, wherein the at least one memory and the computer program code are further configured, with the at least one processor, to cause the apparatus to perform at least the following: choosing a CP extension value to use before transmission of the Msg1 Data Part based on the predetermined point in time the LBT is performed.

An example of another embodiment of the current invention, which can be referred to as item 35, is the apparatus of any preceding apparatus item, wherein the CP extension value is given directly by the RACH configuration or via a range of possible values, wherein the UE chooses the exact value for CP extension based on the preamble index and/or on the time domain index (slot number) of the Msg1 Data Part resource.

An example of another embodiment of the current invention, which can be referred to as item 36. The apparatus of any preceding apparatus item, wherein in response to multiple preambles mapping to same CP extension value the at least one memory and the computer program code are further configured, with the at least one processor, to cause the apparatus to perform at least the following: each preamble is associated with unique DMRS on Msg1 data part.

An example of another embodiment of the current invention, which can be referred to as item 37, is the apparatus of any preceding apparatus item, wherein, based on at least one of the selected PRACH preamble and the selected PRACH preamble group, the at least one memory and the computer program code are further configured, with the at least one processor, to cause the apparatus to perform at least the following: at least one of: determining a number of RACH preamble sequence repetitions to use in RACH preamble transmission; and deciding whether to perform LBT based on RACH preamble sequence detection.

An example of another embodiment of the current invention, which can be referred to as item 38, is the apparatus of any preceding apparatus item, wherein in response to performing LBT based on RACH sequence detection the at least one memory and the computer program code are further configured, with the at least one processor, to cause the apparatus to perform at least the following: calculating time instance relative to the start of RACH preamble or slot boundary for performing RACH preamble sequence detection.

An example of another embodiment of the current invention, which can be referred to as item 39. The apparatus of any preceding apparatus item, wherein the at least one memory and the computer program code are further configured, with the at least one processor, to cause the apparatus to perform at least the following: performing LBT based on energy detection or based on RACH preamble sequence detection at a predetermined point in time.

An example of another embodiment of the current invention, which can be referred to as item 40, is the apparatus of any preceding apparatus item, wherein in response to multiple resources for Msg1 Data Part being indicated in the received RACH configuration and the channel is occupied based on the LBT, the at least one memory and the computer program code are further configured, with the at least one processor, to cause the apparatus to perform at least the following: performing another LBT prior to another Msg1 Data Part resource.

An example of another embodiment of the current invention, which can be referred to as item 41, is the apparatus of any preceding apparatus item, wherein selection of the preamble (and preamble group) depends on at least one of: whether a two-step or a 4-step RA procedure is applied the Msg1 Data Part priority based on the priority of RA triggering event. Payload size of Msg1 Data Part Pathloss.

An example of another embodiment of the current invention, which can be referred to as item 42, is the apparatus of any preceding apparatus item, wherein after transmitting Msg1 Data Part the at least one memory and the computer program code are further configured, with the at least one processor, to cause the apparatus to perform at least the following: monitoring DL control channel for Msg2 of a 2-Step RACH and Msg2 of a 4-step RACH; and in response to receiving: a Msg2 of a 2-Step RACH, ending RA procedure by transmitting an acknowledgement; a Msg2 of a 4-step RACH, continuing 4-step RA procedure by transmitting a Msg3; and no message, returning to selecting the RACH preamble group by the UE and re-transmitting at least PRACH preamble potentially with increased Tx power.

An example of another embodiment of the current invention, which can be referred to as item 43, is the apparatus of any preceding apparatus item, wherein in response UE not having sent Msg1 Data Part in 2-Step RA, the at least one memory and the computer program code are further configured, with the at least one processor, to cause the apparatus to perform at least the following: the monitoring consists of monitoring for the Msg2 of a 4-step RACH.

An example of another embodiment of the current invention, which can be referred to as item 44, is a method comprising: sending a RACH configuration to a UE, wherein the configuration comprises time/frequency resources for each RACH Preamble and a corresponding Msg1 Data Part. This could also be referred to RS sequence here (to support also item 10 for gNB) recognizing that the term "Msg1 Data Part" contains all the necessary info to receive it, as this could be mad by the following addition "time/frequency/RS sequence"; receiving a RACH preamble from the UE; ascertaining the received RACH preamble to be associated with a 2-step RACH procedure; and determining at least one resource for Msg1 Data Part based on the selected RACH preamble; wherein the at least one resource for Msg1 Data part is at least partially overlapping in time and frequency with a resource for Msg1 Data part associated with a different or another RACH preamble, and wherein reception is available on the Msg1 Data Part on the determined at least one resource.

An example of another embodiment of the current invention, which can be referred to as item 45. The method of item 44, wherein the RACH configuration comprises indication of at least one of: at least one resource for Msg1 Data Part before which the UE shall perform a LBT; at least one RACH preamble associated with at least one resource for Msg1 Data Part before which the UE shall perform a LBT; a point in time when the UE shall perform a LBT preceding the Msg1 Data Part associated with at least one RACH preamble An example of another embodiment of the current invention, which can be referred to as item 46, is the method of items 44 and/or 45, wherein the RACH configuration comprises indication on the splitting of RACH preambles into one or more preamble groups, where each of the RACH preamble groups is associated with at least one of: whether contention or non-contention based RA procedure is used; whether 2-step or 4-step RA procedure is used; priority of Msg1 Data Part transmission in case of 2-step RA procedure; payload size of Msg1 Data Part; pathloss.

An example of another embodiment of the current invention, which can be referred to as item 47, is the method of any of items 44-46, after receiving or attempting to receive the Msg1 Data Part, further comprising: in response to receiving the Msg1 Data Part, transmitting Msg2 of a 2-step RA procedure to the UE, and in response to not receiving the Msg1 Data part, transmitting Msg2 of a 4-step RA procedure to the UE.

An example of another embodiment of the current invention, which can be referred to as item 48, is a computer program comprising code for controlling or performing the method of any of items 44-47.

An example of another embodiment of the current invention, which can be referred to as item 49, is a computer program comprising: code for sending a RACH configuration to a UE, wherein the configuration comprises time/frequency resources for each RACH Preamble and a corresponding Msg1 Data Part. This could also be referred to RS sequence here (to support also item 10 for gNB) recognizing that the term "Msg1 Data Part" contains all the necessary info to receive it, as this could be mad by the following addition "time/frequency/RS sequence"; code for receiving a RACH preamble from the UE; code for ascertaining the received RACH preamble to be associated with a 2-step RACH procedure; and code for determining at least one resource for Msg1 Data Part based on the selected RACH preamble; wherein the at least one resource for Msg1 Data part is at least partially overlapping in time and frequency with a resource for Msg1 Data part associated with a different or another RACH preamble, and wherein reception is available on the Msg1 Data Part on the determined at least one resource.

An example of another embodiment of the current invention, which can be referred to as item 50, is a computer program product comprising a computer-readable medium bearing the computer program code of items 48 or 49 embodied therein for use with a computer.

An example of another embodiment of the current invention, which can be referred to as item 51, is a computer program product embodied on a non-transitory computer-readable medium in which a computer program is stored that, when being executed by a computer, is configured to provide instructions to control or carry out the method of any of items 44-47.

An example of another embodiment of the current invention, which can be referred to as item 52, is a computer program product embodied on a non-transitory computer-readable medium in which a computer program is stored that, when being executed by a computer, is configured to provide instructions to control or carry out at least the following: sending a RACH configuration to a UE, wherein the configuration comprises time/frequency resources for each RACH Preamble and a corresponding Msg1 Data Part. This could also be referred to RS sequence here (to support also item 10 for gNB) recognizing that the term "Msg1 Data Part" contains all the necessary info to receive it, as this could be mad by the following addition "time/frequency/RS sequence"; receiving a RACH preamble from the UE; ascertaining the received RACH preamble to be associated with a 2-step RACH procedure; and determining at least one resource for Msg1 Data Part based on the selected RACH preamble; wherein the at least one resource for Msg1 Data part is at least partially overlapping in time and frequency with a resource for Msg1 Data part associated with a different or another RACH preamble, and wherein reception is available on the Msg1 Data Part on the determined at least one resource.

An example of another embodiment of the current invention, which can be referred to as item 53, is a device comprising means for performing each step of items 44-47.

An example of another embodiment of the current invention, which can be referred to as item 54, is a device comprising: means for sending a RACH configuration to a UE, wherein the configuration comprises time/frequency resources for each RACH Preamble and a corresponding Msg1 Data Part. This could also be referred to RS sequence here (to support also item 10 for gNB) recognizing that the term "Msg1 Data Part" contains all the necessary info to receive it, as this could be mad by the following addition "time/frequency/RS sequence"; means for receiving a RACH preamble from the UE; means for ascertaining the received RACH preamble to be associated with a 2-step RACH procedure; means for determining at least one resource for Msg1 Data Part based on the selected RACH preamble; wherein the at least one resource for Msg1 Data part is at least partially overlapping in time and frequency with a resource for Msg1 Data part associated with a different or another RACH preamble; wherein reception is available on the Msg1 Data Part on the determined at least one resource.

An example of another embodiment of the current invention, which can be referred to as item 55, is an apparatus comprising: at least one processor; and at least one memory including computer program code, wherein the at least one memory and the computer program code are configured, with the at least one processor, to cause the apparatus to perform at least the following: sending a RACH configuration to a UE, wherein the configuration comprises time/frequency resources for each RACH Preamble and a corresponding Msg1 Data Part. This could also be referred to RS sequence here (to support also item 10 for gNB) recognizing that the term "Msg1 Data Part" contains all the necessary info to receive it, as this could be mad by the following addition "time/frequency/RS sequence"; receiving a RACH preamble from the UE; ascertaining the received RACH preamble to be associated with a 2-step RACH procedure; and determining at least one resource for Msg1 Data Part based on the selected RACH preamble; wherein the at least one resource for Msg1 Data part is at least partially overlapping in time and frequency with a resource for Msg1 Data part associated with a different or another RACH preamble, and wherein reception is available on the Msg1 Data Part on the determined at least one resource.

An example of another embodiment of the current invention, which can be referred to as item 56. The apparatus of item 54, wherein the RACH configuration comprises indication of at least one of: at least one resource for Msg1 Data Part before which the UE shall perform a LBT; at least one RACH preamble associated with at least one resource for Msg1 Data Part before which the UE shall perform a LBT; a point in time when the UE shall perform a LBT preceding the Msg1 Data Part associated with at least one RACH preamble An example of another embodiment of the current invention, which can be referred to as item 57, is the apparatus of items 54 and/or 55, wherein the RACH configuration comprises indication on the splitting of RACH preambles into one or more preamble groups, where each of the RACH preamble groups is associated with at least one of: whether contention or non-contention based RA procedure is used; whether 2-step or 4-step RA procedure is used; priority of Msg1 Data Part transmission in case of 2-step RA procedure; payload size of Msg1 Data Part; pathloss.

An example of another embodiment of the current invention, which can be referred to as item 58, is the apparatus of any of items 54-56, wherein after receiving or attempting to receive the Msg1 Data Part, the at least one memory and the computer program code are further configured, with the at least one processor, to cause the apparatus to perform at least the following: in response to receiving the Msg1 Data Part, transmitting Msg2 of a 2-step RA procedure to the UE, and in response to not receiving the Msg1 Data part, transmitting Msg2 of a 4-step RA procedure to the UE.

Although various aspects are set out above, other aspects comprise other combinations of features from the described embodiments, and not solely the combinations described above.

It is also noted herein that while the above describes example embodiments of the invention, these descriptions should not be viewed in a limiting sense. Rather, there are several variations and modifications which may be made without departing from the scope of the present invention.

What is claimed is:

1. A method comprising:
   receiving a random access channel (RACH) configuration by a user equipment, wherein the configuration comprises time and/or frequency resources for each RACH Preamble and a corresponding first message (Msg1) data part;
   selecting a RACH preamble by the user equipment;
   transmitting the selected RACH preamble;
   performing a listening before talk (LBT) at a predetermined point in time;
   transmitting the Msg1 data part provided that a channel is unoccupied based on the LBT;
   monitoring downlink control channel for a second message (Msg2) of a 2-step random access procedure or a 4-step random access procedure; and
   in response to receiving:
   Msg2 of the 2-step random access procedure, ending random access procedure by transmitting an acknowledgement;
   Msg2 of the 4-step random access procedure, continuing the 4-step random access procedure by transmitting a third message (Msg3).

2. The method of claim 1, wherein the first message comprises the RACH preamble and Msg1 data part.

3. The method of claim 1, wherein selecting a RACH preamble comprises:
   selecting a preamble group from at least one preamble group, and
   selecting a RACH preamble from the selected preamble group.

4. The method of claim 3, wherein the at least one preamble group is grouped based on at least one of:
   whether contention or non-contention based random access procedure is used;
   whether 2-step or 4-step random access procedure is used;
   priority of Msg1 data part in the case of 2-step random access procedure.

5. The method of claim 1, further comprising:
   choosing a cyclic prefix extension value to use before transmission of the Msg1 data part.

6. The method of claim 5, wherein the cyclic prefix extension value is given directly by the RACH configuration or via a range of possible values.

7. The method of claim 1, wherein performing LBT comprises performing LBT based on energy detection or RACH preamble sequence detection.

8. The method of claim 1, further comprising:
in response to receiving:
no message, returning to selecting the RACH preamble by the user equipment and re-transmitting at least RACH preamble with increased transmission power.

9. The method of claim 1, wherein in response to the user equipment not having sent Msg1 data part in 2-step random access, the monitoring downlink control channel comprises monitoring for the Msg2 of a 4-step RACH.

10. An apparatus comprising:
at least one processor; and
at least one memory including computer program code, wherein the at least one memory and the computer program code are configured to, with the at least one processor, cause the apparatus to at least:
receive a random access channel (RACH) configuration, wherein the configuration comprises time and/or frequency resources for each RACH Preamble and a corresponding first message (Msg1) data part;
select a RACH preamble;
transmit the selected RACH preamble;
perform a listening before talk (LBT) at a predetermined point in time;
transmit the Msg1 data part provided that a channel is unoccupied based on the LBT;
monitor downlink control channel for a second message (Msg2) of a 2-step random access procedure or a 4-step random access procedure; and
in response to receiving:
Msg2 of the 2-step random access procedure, end random access procedure by transmitting an acknowledgement;
Msg2 of the 4-step random access procedure, continue the 4-step random access procedure by transmitting a third message (Msg3).

11. The apparatus of claim 10, wherein the first message comprises the RACH preamble and Msg1 data part.

12. The apparatus of claim 10, wherein selecting a RACH preamble comprises:
selecting a preamble group from at least one preamble group, and
selecting a RACH preamble from the selected preamble group.

13. The apparatus of claim 12, wherein the at least one preamble group is grouped based on at least one of:
whether contention or non-contention based random access procedure is used;
whether 2-step or 4-step random access procedure is used;
priority of Msg1 data part in the case of 2-step random access procedure.

14. The apparatus of claim 10, wherein the at least one memory and the computer program code are further configured to, with the at least one processor, cause the apparatus to at least:
choose a cyclic prefix extension value to use before transmission of the Msg1 data part.

15. The apparatus of claim 14, wherein the cyclic prefix extension value is given directly by the RACH configuration or via a range of possible values.

16. The apparatus of claim 10, wherein performing LBT comprises performing LBT based on energy detection or RACH preamble sequence detection.

17. The apparatus of claim 10, wherein the at least one memory and the computer program code are further configured to, with the at least one processor, cause the apparatus to at least:
in response to receiving:
no message, return to selecting the RACH preamble and re-transmit at least RACH preamble with increased transmission power.

18. The apparatus of claim 10, wherein in response to the apparatus not having sent Msg1 data part in 2-step random access, the monitoring downlink control channel comprises monitoring for the Msg2 of a 4-step RACH.

19. The apparatus of claim 10, wherein the RACH configuration is received in system information.

20. An apparatus comprising:
at least one processor; and
at least one memory including computer program code, wherein the at least one memory and the computer program code are configured, with the at least one processor, to cause the apparatus to perform at least the following:
send a random access channel (RACH) configuration to a user equipment, wherein the configuration comprises time and/or frequency resources for each RACH preamble and a corresponding first message (Msg1) data part;
receive a RACH preamble from the user equipment;
determine whether the received RACH preamble is associated with a 2-step random access procedure or a 4-step random access procedure; and
transmit a second message (Msg2) to the user equipment based on the determination.

* * * * *